United States Patent
Piry et al.

(10) Patent No.: US 7,809,930 B2
(45) Date of Patent: Oct. 5, 2010

(54) SELECTIVE SUPPRESSION OF REGISTER RENAMING

(75) Inventors: Frederic Claude Marie Piry, Cagnes-sur-Mer (FR); Norbert Bernard Eugene Lataille, Le Cannet (FR)

(73) Assignee: ARM Limited, Cambridge (GB)

( * ) Notice: Subject to any disclaimer, the term of this patent is extended or adjusted under 35 U.S.C. 154(b) by 287 days.

(21) Appl. No.: 11/657,134

(22) Filed: Jan. 24, 2007

(65) Prior Publication Data

US 2008/0177983 A1      Jul. 24, 2008

(51) Int. Cl.
    *G06F 9/34* (2006.01)
(52) U.S. Cl. .................................. 712/217
(58) Field of Classification Search ............... 712/217
    See application file for complete search history.

(56) References Cited

U.S. PATENT DOCUMENTS

| | | | |
|---|---|---|---|
| 6,061,777 A * | 5/2000 | Cheong et al. ............... 712/23 |
| 6,170,052 B1 * | 1/2001 | Morrison ...................... 712/236 |
| 6,826,677 B2 * | 11/2004 | Topham ....................... 712/217 |
| 7,127,592 B2 * | 10/2006 | Abraham et al. ............ 712/217 |

\* cited by examiner

*Primary Examiner*—David J Huisman
(74) *Attorney, Agent, or Firm*—Nixon & Vanderhye P.C.

(57) ABSTRACT

A register renaming unit has mapping control circuitry which serves to suppress unnecessary mapping operations in dependence upon a detected current state of the data processing system. One example of circumstances which can be detected from the current state and in which mapping can be suppressed and the existing mapping reused are that in respect of the existing physically mapped register there are no pending writes, no pending reads and no pending requirement for that physically mapped register to be preserved as a recovery register. Another example of a current state in which a mapping can be reused is adjacent program instructions having mutually exclusive condition codes and sharing a destination register such that only one of those adjacent instructions will ever be executed.

17 Claims, 3 Drawing Sheets

SELECTIVE SUPPRESSION OF REGISTER RENAMING

BACKGROUND OF THE INVENTION

1. Field of the Invention

This invention relates to the field of data processing systems. More particularly, this invention relates to data processing systems utilising register renaming so as, for example, to facilitate out-of-order processing.

2. Description of the Prior Art

It is known to provide data processing systems in which register renaming mechanisms are used whereby register specifiers for an architectural destination register (i.e. the destination register as specified within an instruction of the instruction set) is mapped to a physical register provided within the system for use in executing the associated program instruction. Such techniques are useful in avoiding write-after-read (WAR) hazards, write-after-write (WAW) hazards and in facilitating the reordering of instructions at execution time. The technique is also useful in enabling a data processing system to speculate over unresolved exception points within the program instruction flow. It will be appreciated that register renaming is useful for a variety of reasons, and is not limited in its application to out-of-order processing.

In known register renaming techniques a processor core renames an architectural register specified by an instruction thereby allocating a new physical register to be used in place of an architectural register for each architectural destination register specifier encountered within each instruction. Once this allocation/mapping is done, then the processor core can execute the instruction using the physical registers in the "physical register world".

There are a number of drawbacks associated with known register renaming techniques. The number of physical registers which may be provided is finite and the register renaming mechanism can run short of available physical registers to be used for mapping to architectural registers. This is particularly the case in data processing systems in which program instructions can involve the use of a large number of registers, e.g. the LDM (load multiple) instructions of the ARM instruction set of the processors produced by ARM Limited of Cambridge, England. If the register renaming mechanism runs out of available physical registers to use for the remapping then this can stall the instruction pipeline. This problem gets worse as pipeline depth increases as there will be more program instructions concurrently "in-flight" and consuming physical registers.

One way of reducing this problem would be to provide a larger number of physical registers. However, the provision of such physical registers consumes circuit area and power, which is in itself disadvantageous.

Another problem associated with register renaming techniques is that the register renaming processing mechanisms themselves consume power and have a finite bandwidth. Signal values transitioning within the register renaming mechanisms to perform mappings for every architectural destination register encountered within an instruction represent a significant source of energy consumption. Furthermore, when some instructions may have a large number of architectural destination registers, either a disadvantageously large register renaming mechanism has to be provided in order that these renaming operations can all be performed in parallel, or the renaming operations have to be serially performed with a consequent potential for stalls and/or delayed processing.

SUMMARY OF THE INVENTION

Viewed from one aspect the present invention provides apparatus for processing data, said apparatus comprising:

a physical set of registers;

register renaming circuitry for mapping from register specifiers of an architectural set of register specifiers to registers of said physical set of registers, said architectural set of register specifiers representing registers as specified by instructions within an instruction set and said physical set of registers being physical registers for use in executing instructions of said instruction set; and mapping control circuitry coupled to said register renaming circuitry and responsive to a current state of said apparatus to control said register renaming circuitry in respect of a register specifier of said architectural set of registers specifiers for an instruction either:

(i) to suppress performance of a mapping operation thereby preserving an existing mapping from said register specifier to a register of said physical set of registers; or (ii) to generate a mapping from said register specifier to a register of said physical set of registers.

The present technique recognizes that the known techniques for register renaming in which a renaming operation is performed for each architectural destination register whilst being safe in the sense of avoiding various hazards (e.g. WAR, WAW etc) are wasteful in terms of numbers of physical registers required, consumed renaming bandwidth and energy consumption associated with renaming since a significant portion of the renaming, mappings performed are unnecessary. As an example, it is known that compilers often target particular registers for use as source and destination registers more than other registers which are equally available. Thus, an infrequently used register may be renamed by an architectural to physical mapping and then all the processing activity associated with that mapped physical register finished prior to the next time the architectural register is encountered and is a candidate for a further mapping to a physical register. In this circumstance, the present technique recognizes from the current state of the system that a new mapping is not required and consequently suppresses performance of a mapping operation by the register renaming circuitry and instead allows the existing mapping to be reused. This saves consuming a further physical register as well as saving the processing steps and renaming bandwidth which would be involved in such an unnecessary mapping operation. It will be appreciated that this is merely one example of the circumstances in which the mapping operation may be suppressed.

Whilst the current state of the system to which the mapping control circuitry can be responsive to suppress or not suppress the mapping operation can take a wide variety of different forms, one good candidate for use in suppressing unnecessary mapping operations is detecting when the current state indicates whether the register of the physical set of registers mapped by an existing mapping is allocated to storing a value still required for at least some outcomes of one or more other instructions, whereupon the mapping operation is not suppressed as the existing mapping is not available for use.

The ways in which a value stored within a physical register in accordance with an existing mapping may be required for at least some outcome of other instructions include the use of that value for recovery from one or more speculative changes in architectural state (recovery for example being necessary due to one of a branch misprediction, an abort, an exception and an interrupt), a requirement due to another instruction still needing to read the value stored within that physical register as part of its execution, or the requirement of the original instruction or some other instruction (e.g. one which had already reused the mapping) to write a value to that physical register.

Another example of current state of the system which can be detected and used to suppress unnecessary mappings is the detection of the circumstance in which a mapping is allocated to storing a value written by a first instruction with the same architectural register being written by a second instruction when the first instruction and the second instruction have mutually exclusive conditions controlling their execution such that only one of the first instruction or the second instruction will be executed. In this circumstance, due to the relationship of the mutually exclusive conditions controlling execution of the two instructions, a write-after-write hazard does not exist and the register mapping can be reused without hazard. In practice, this type of relationship between instructions is surprisingly common and accordingly the mechanisms deployed to recognize such situations (e.g. which may be recognizing adjacent instructions with mutually exclusive condition codes) can be relatively simple and yet yield a significant advantage in avoiding unnecessary register renaming.

Viewed from another aspect the present invention provides apparatus for processing data, said apparatus comprising:
 a physical set of registers;
 register renaming means for mapping from register specifiers of an architectural set of register specifiers to registers of said physical set of registers, said architectural set of register specifiers representing registers as specified by instructions within an instruction set and said physical set of registers being physical registers for use in executing instructions of said instruction set; and
 mapping control means coupled to said register renaming circuitry and responsive to a current state of said apparatus for controlling said register renaming circuit in respect of a register specifier of said architectural set of registers specifiers for an instruction either:
  (i) to suppress performance of a mapping operation thereby preserving an existing mapping from said register specifier to a register of said physical set of registers; or
  (ii) to generate a mapping from said register specifier to a register of said physical set of registers.
 Viewed from a further aspect the present invention provides a method of processing data, said apparatus comprising the steps of:
 mapping from register specifiers of an architectural set of register specifiers to registers of a physical set of registers, said architectural set of register specifiers representing registers as specified by instructions within an instruction set and said physical set of registers being physical registers for use in executing instructions of said instruction set; and
  controlling said mapping in respect of a register specifier of said architectural set of registers specifiers for an instruction either:
  (i) to suppress performance of a mapping operation thereby preserving an existing mapping from said register specifier to a register of said physical set of registers; or
  (ii) to generate a mapping from said register specifier to a register of said physical set of registers.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
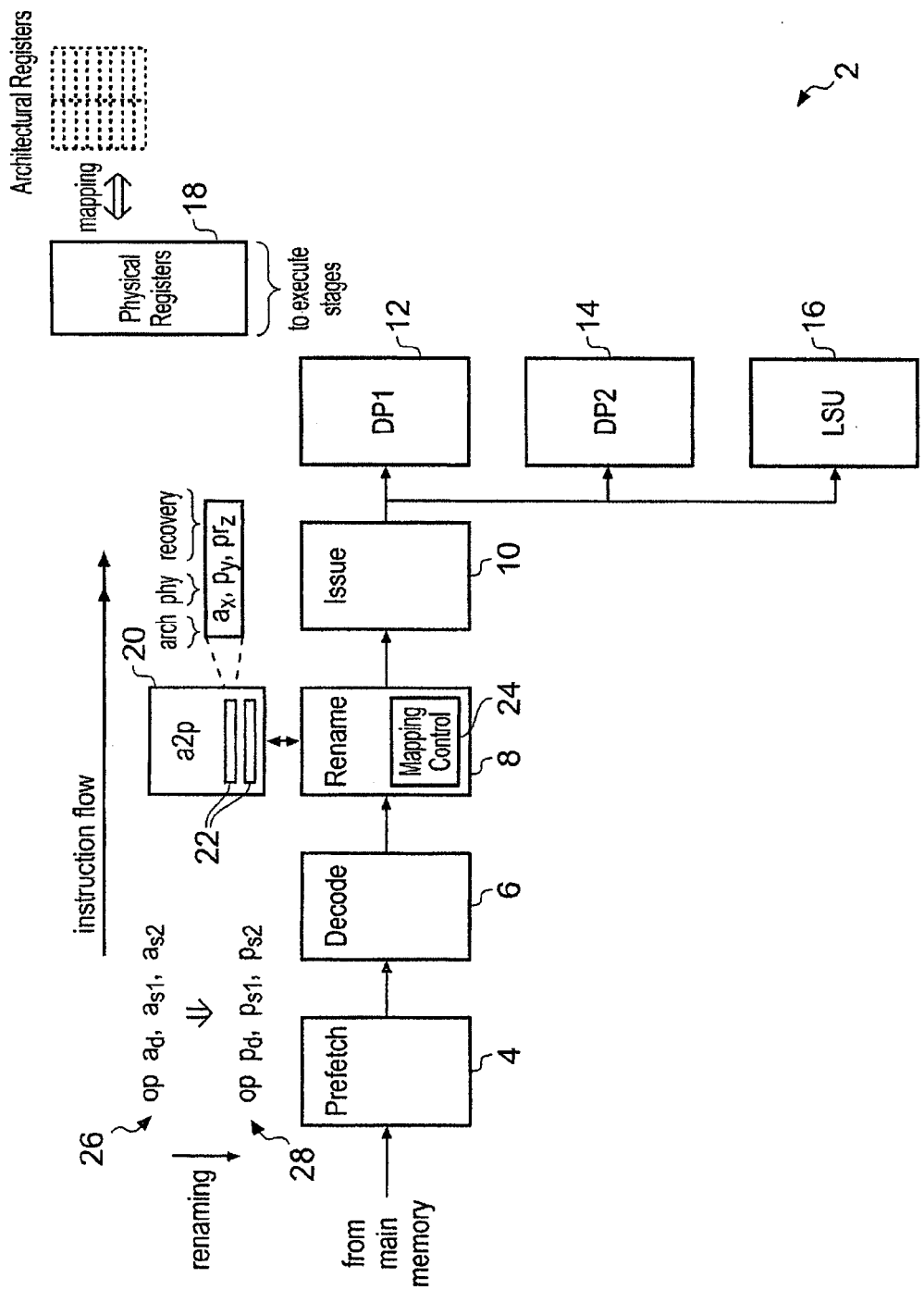
FIG. 1 schematically illustrates a data processing system utilizing register renaming for mapping between architectural register specifiers as used within instructions of an instruction set and physical register specifiers for physical registers.

FIG. 1 illustrates a data processing apparatus 2 having an instruction pipeline including a prefetch unit 4, a decoder 6, a renaming unit 8, an issue unit 10 and parallel execution units comprising first and second data processing units 12, 14 and a load store unit 16. It will be appreciated by those familiar with this technical field that the data processing system 2 will contain many further elements and these have been omitted from FIG. 1 for the sake of clarity and as they do not relate to the present technique of suppressing unnecessary register renaming operations.

Illustrated in FIG. 1 is a bank of physical registers 18, which are used by the data processing units 12, 14 and the load store unit 16 in executing instructions once these have been subject to register renaming by the renaming unit 8. The renaming unit 8 has an associated architectural to physical mapping table 20 storing existing mappings being used between architectural register specifiers and physical registers within the physical register bank 18. These mappings relate an architectural register specifier $a_x$ to a physical register specifier $p_y$ and also to a physical register specifier for a recovery register $pr_z$ to be used if the writing to the physical register $p_y$ was incorrectly speculated (e.g. a branch misprediction, an abort, an exception, an interrupt etc occurs). The architectural to physical mapping table 20 also includes various control registers 22 which can store flags indicating, for example, which of the physical registers from the physical register bank 18 currently have pending writes or pending reads associated with them, which are available for reuse and other parameters associated with the management of register renaming. The register renaming itself can be performed and controlled in a variety of ways as will be familiar to those in this technical field. The present technique adds mapping control circuitry 24, which has the function of suppressing unnecessary register mapping operations by the renaming unit 8 when it is detected from aspects of the current state of the data processing system 2 that such remapping operations are unnecessary.

Also illustrated in FIG. 1 is an instruction 26 as fetched from main memory and an instruction 28 corresponding to the instruction 26 after it has been subject to register renaming in which the architectural destination and source register specifiers have been replaced by physical destination and source register specifiers. It is the renamed instruction 28 which progresses along the instruction pipeline downstream of the renaming unit 8 and is issued by the issue unit 10 (potentially out of order).

Figure 2:
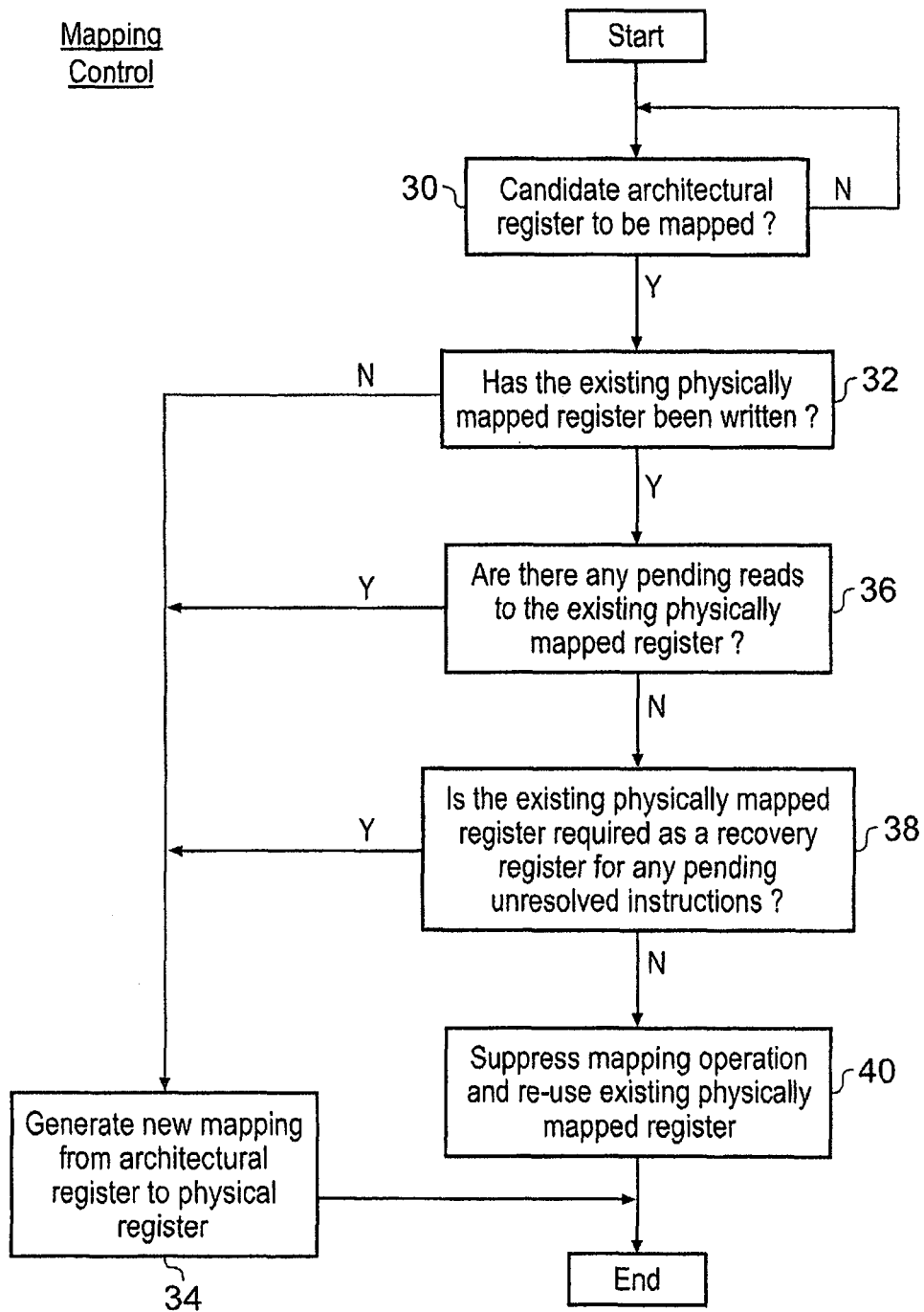
FIG. 2 is a flow diagram illustrating processing performed by mapping control circuitry in suppressing unnecessary mapping operations in accordance with a first category of unnecessary mapping operations.

As mentioned above, the mapping control circuitry 24 serves to suppress mapping operations by the renaming unit 8 when these are unnecessary. In this case the existing mapping is used and the architectural register renamed with the physical register specifier to produce an instruction in the form of instruction 28 that has been renamed. FIG. 2 illustrates one example of the processing which may be performed by the mapping control circuitry 8 to suppress one class of unnecessary mapping operations. At step 30 the process waits for a candidate architectural register which potentially needs mapping to be encountered within an instruction 26. At step 32, the mapping control circuit 28 checks whether the existing physically mapped register for the architectural register concerned has already been written by those preceding instructions utilizing that physical register as a destination register. If there are pending writes to that physical register, then processing proceeds to step 34 where a new register mapping is generated by a mapping operation using the renaming unit 8 since in this circumstance the existing mapping cannot be reused without generating a potential write-after-write hazard.

If the determination at step 32 was that there are no pending writes, then step 36 checks for any pending reads to the existing physically mapped register which is the candidate for reuse. If there are any such pending reads (e.g. as monitored by the renaming unit 8 using the architectural to physical table 20 and its associated control registers 22), then processing again proceeds to step 34 and a new mapping is generated.

If the determination at step 36 was that there are no pending reads, then step 38 determines whether or not the existing physically mapped register is still required as a recovery register for any pending unresolved instructions. It may be that due to incorrect speculative execution of an instruction by the system the value held in the existing physically mapped register will be needed for use as a recovery register when the processing is rewound following correction of the incorrect speculation. If the determination at step 38 is that the existing physically mapped register is not required as a recovery register for any pending unresolved instructions, then the existing physically mapped register is properly available for re-use and according step 40 suppresses the mapping operation which would otherwise be performed by the renaming unit 8 and instead simply reuse the existing physically mapped register to rename the register specifier in the instruction using the mapping already held within the architectural to physical mapping table 20. This saves renaming bandwidth within the renaming unit 8 and reduces the power consumption of the renaming unit 8.

Figure 3:
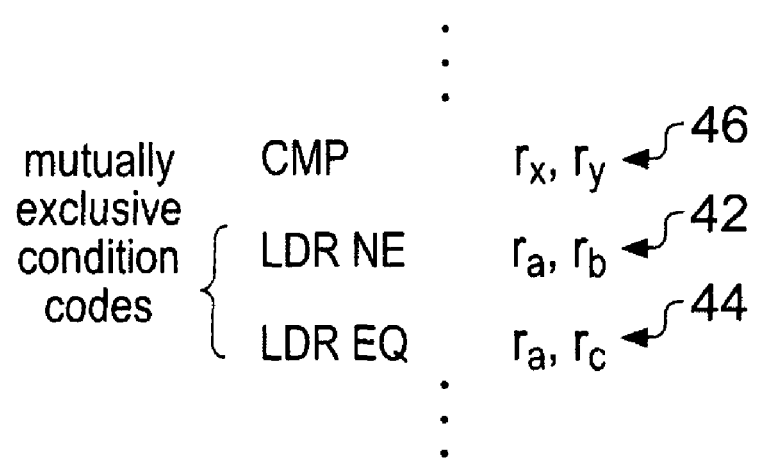
FIG. 3 illustrates instructions having mutually exclusive condition codes controlling their execution and between which there is no write-after-write hazard such that the mapping for the destination register of the first instruction can be reused for the destination register of the second instruction.

FIG. 3 illustrates another example of current state of the data processing system 2. Using the example of FIG. 3, unnecessary mapping operations can be identified and suppressed. Illustrated in FIG. 3 are two adjacent program instructions 42 and 44. These adjacent program instructions 42, 44 each perform a load to a destination register $r_a$. The two instructions 42, 44 use different source registers, namely $r_b$ and $r_c$. The two instructions have mutually exclusive condition codes associated therewith to control (predicate) their respective execution. These condition codes are that the flags set in response to a compare instruction 46 preceding the two instructions have either resulted in a not result or an equal result. Accordingly, it will be appreciated that as a consequence of the mutually exclusive conditions predicating the execution of the two instructions 42, 44, only one of these instructions will execute. The sequential nature of the load store unit 16 in this example ensures that the ordering of the load instructions 42, 44 is not changed and intervening instructions which could generate hazards are not placed therebetween. Thus, the adjacent instructions 42, 44 having mutually exclusive condition codes and sharing a common architectural destination register are an example of a current state which might be thought to potentially represent a write-after-write hazard but that in practice does not present such a hazard and accordingly allows the same physical register to be used as the destination register $r_a$ for both the first instruction 42 and the second instruction 44. Accordingly, when the second instruction 44 is being processed by the renaming unit 8, the mapping control circuitry 24 suppresses a mapping operation in respect of the destination register $r_a$ for the second instruction 44 and instead reuse the existing mapping already in place for the first instruction 42. The mapping control circuitry 24 can snoop the opcodes and condition codes as well as the destination register specifiers within the instructions being fed to the renaming unit 8 in order to identify the current state illustrated in FIG. 3 in order to suppress the unnecessary mapping as described above.

It will be appreciated that there may be other circumstances in which unnecessary mappings may be suppressed in register renaming. The above are common examples where the technique produces a good return for the necessary provision of control circuitry in the mapping control circuitry 24.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data, said apparatus comprising:

a physical set of registers;

register renaming circuitry for mapping from register specifiers of an architectural set of register specifiers to registers of said physical set of registers, said architectural set of register specifiers representing registers as specified by instructions within an instruction set and said physical set of registers being physical registers for use in executing instructions of said instruction set; and mapping control circuitry, coupled to said register renaming circuitry and responsive to a current state of said apparatus, configured to control said register renaming circuitry in respect of a register specifier of said architectural set of register specifiers for an instruction either:

(i) to suppress performance of a mapping operation thereby preserving an existing mapping from said register specifier to a register of said physical set of registers; or (ii) to generate a mapping from said register specifier to a register of said physical set of registers, wherein said current state includes whether said register of said physical set of registers mapped by said existing mapping is allocated to storing a value still required for at least some outcomes of one or more other instructions, wherein said mapping control circuitry does not suppress performance of said mapping operation if said register of said physical set of registers mapped by said existing mapping is allocated to storing a value still required for at least some outcomes of one or more other instructions, and said mapping control circuitry suppresses performance of said mapping operation if said register of said physical set of registers mapped by said existing mapping is not allocated to storing a value still required for at least some outcomes of one or more other instructions.

2. An apparatus as claimed in claim 1, wherein said at least some outcomes include recovery from one or more changes in architectural state of said apparatus made by said one or more other instructions, said register of said physical set of registers storing a recovery value.

3. An apparatus as claimed in claim 2, wherein said recovery is triggered by one of
   a branch misprediction;
   an abort;
   an exception; and
   an interrupt.

4. An apparatus as claimed in claim 1, wherein said at least some outcomes include reading of said value as part of execution of said one or more other instructions.

5. An apparatus as claimed in claim 1, wherein said at least some outcomes include writing of said value as part of execution of said one or more other instructions.

6. An apparatus as claimed in claim 1, wherein said current state includes whether said register of said physical set of registers mapped by said existing mapping is allocated to storing a value to be written by an other instruction, said instruction and said other instruction having mutually exclusive conditions controlling execution thereof such that only one of said instruction and said other instruction will be executed, whereupon said mapping control circuitry suppresses performance of said mapping operation.

7. An apparatus as claimed in claim 6, wherein said instruction and said other instruction have mutually exclusive condition codes associated therewith.

8. An apparatus as claimed in claim 6, wherein said instruction and said other instruction are adjacent instructions within a sequence of program instructions.

9. An apparatus for processing data, said apparatus comprising:
   a physical set of registers;
   register renaming means for mapping from register specifiers of an architectural set of register specifiers to registers of said physical set of registers, said architectural set of register specifiers representing registers as specified by instructions within an instruction set and said physical set of registers being physical registers for use in executing instructions of said instruction set; and
   mapping control means, coupled to said register renaming circuitry and responsive to a current state of said apparatus, for controlling said register renaming circuit in respect of a register specifier of said architectural set of registers specifiers for an instruction either:
   (i) to suppress performance of a mapping operation thereby preserving an existing mapping from said register specifier to a register of said physical set of registers; or
   (ii) to generate a mapping from said register specifier to a register of said physical set of registers, wherein said current state includes whether said register of said physical set of registers mapped by said existing mapping is allocated to storing a value still required for at least some outcomes of one or more other instructions, wherein said mapping control means does not suppress performance of said mapping operation if said register of said physical set of registers mapped by said existing mapping is allocated to storing a value still required for at least some outcomes of one or more other instructions, and said mapping control means suppresses performance of said mapping operation if said register of said physical set of registers mapped by said existing mapping is not allocated to storing a value still required for at least some outcomes of one or more other instructions.

10. A method of processing data using a data processing apparatus said method comprising the steps of:
   mapping from register specifiers of an architectural set of register specifiers to registers of a physical set of registers, said architectural set of register specifiers representing registers as specified by instructions within an instruction set and said physical set of registers being physical registers for use in executing instructions of said instruction set; and
   controlling said mapping, in response to a current state of said apparatus, in respect of a register specifier of said architectural set of registers specifiers for an instruction either:
   (i) to suppress performance of a mapping operation thereby preserving an existing mapping from said register specifier to a register of said physical set of registers; or
   (ii) to generate a mapping from said register specifier to a register of said physical set of registers, wherein said current state includes whether said register of said physical set of registers mapped by said existing mapping is allocated to storing a value still required for at least some outcomes of one or more other instructions, wherein said step of controlling does not suppress performance of said mapping step if said register of said physical set of registers mapped by said existing mapping is allocated to storing a value still required for at least some outcomes of one or more other instructions, and said step of controlling suppresses performance of said mapping step if said register of said physical set of registers mapped by said existing mapping is not allocated to storing a value still required for at least some outcomes of one or more other instructions.

11. A method as claimed in claim 10, wherein said at least some outcomes include recovery from one or more changes in architectural state made by said one or more other instructions, said register of said physical set of registers storing a recovery value.

12. A method as claimed in claim 11, wherein said recovery is triggered by one of:
   a branch misprediction;
   an abort;
   an exception; and
   an interrupt.

13. A method as claimed in claim 10, wherein said at least some outcomes include reading of said value as part of execution of said one or more other instructions.

14. A method as claimed in claim 10, wherein said at least some outcomes include writing of said value as part of execution of said one or more other instructions.

15. A method as claimed in claim 10, wherein said current state includes whether said register of said physical set of registers mapped by said existing mapping is allocated to storing a value to be written by an other instruction, said instruction and said other instruction having mutually exclusive conditions controlling execution thereof such that only one of said instruction and said other instruction will be executed, whereupon said step of controlling suppresses performance of said mapping step.

16. A method as claimed in claim 15, wherein said instruction and said other instruction have mutually exclusive condition codes associated therewith.

17. A method as claimed in claim 15, wherein said instruction and said other instruction are adjacent instructions within a sequence of program instructions.

* * * * *